R. W. PITTMAN.
MOTION PICTURE APPARATUS MAGAZINE.
APPLICATION FILED SEPT. 3, 1920.
1,403,522.
Patented Jan. 17, 1922.
2 SHEETS—SHEET 1.
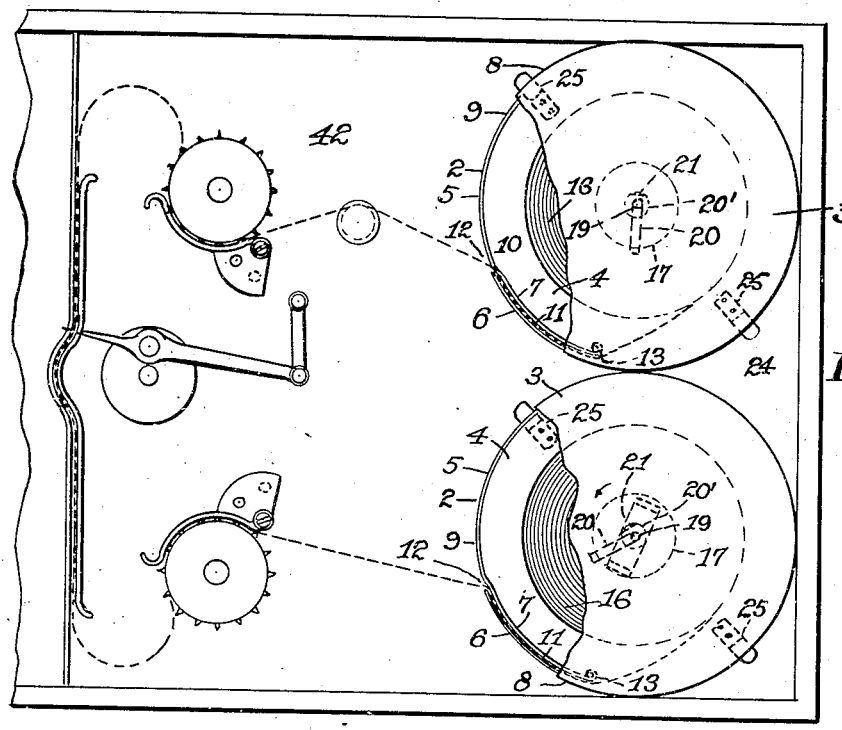
Fig. 1.
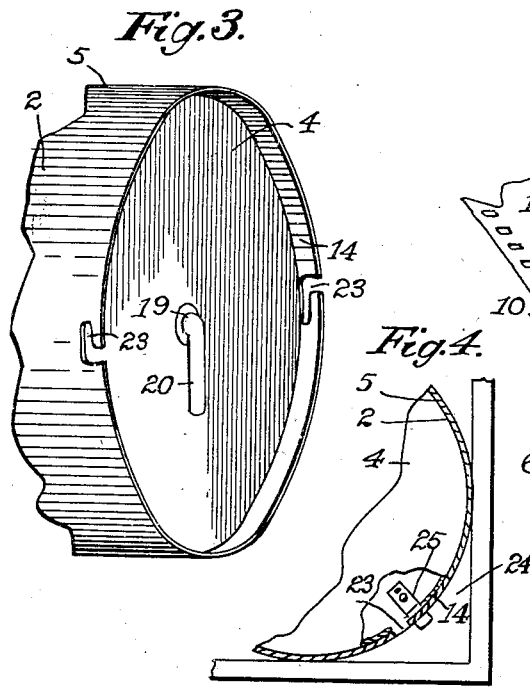
Fig. 3.
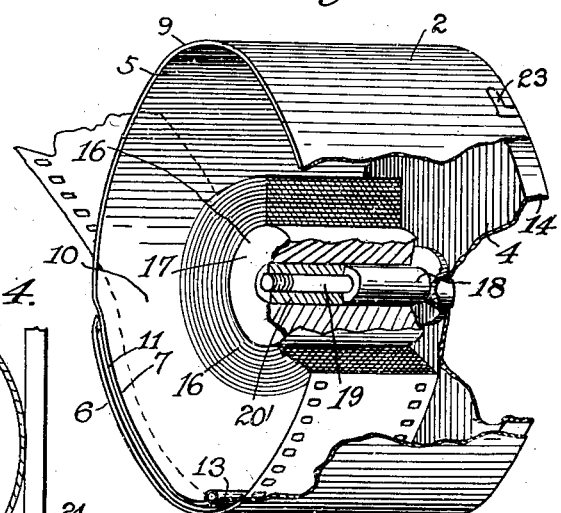
Fig. 2.
Fig. 4.
Inventor:
R. W. Pittman.
By his Attorney
Wm. H. Reid.

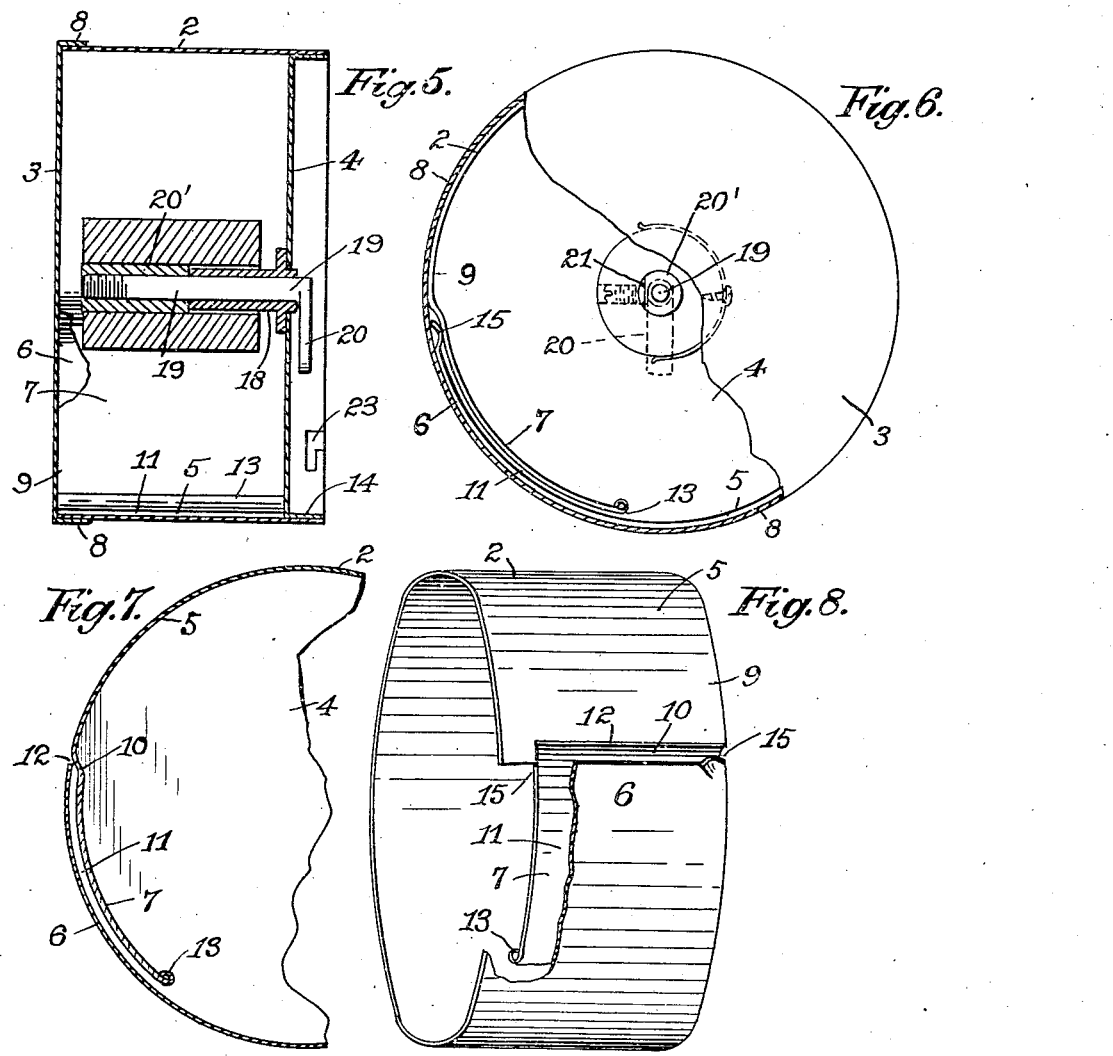

UNITED STATES PATENT OFFICE.

REINHART W. PITTMAN, OF NEW YORK, N. Y.

MOTION-PICTURE-APPARATUS MAGAZINE.

1,403,522.  Specification of Letters Patent.  Patented Jan. 17, 1922.

Application filed September 3, 1920. Serial No. 407,890.

*To all whom it may concern:*

Be it known that I, REINHART W. PITTMAN, a citizen of the United States, and a resident of New York city, county of New York, and State of New York, have invented certain new and useful Improvements in Motion-Picture-Apparatus Magazine, of which the following is a specification.

This invention has reference to cameras, particularly the kind that employ a length of film that has successive portions exposed to be photographed or to be projected at the image portions thereon.

The object of the invention is to provide a simple and compact form of container that can receive a roll of film, to be withdrawn therefrom as unwound; and also which container, of the same nature can have the film received and wound therein.

A further object is to provide an outlet passage that is open at one side for insertion and removal of the film by lateral movement.

In the accompanying drawings showing embodiments of my invention, Fig. 1 shows a portion of a camera with two of the containers, and film feeding means.

Fig. 2 shows a perspective view, partly broken, of one container with one cover removed.

Fig. 3 shows a removable end member of the container.

Fig. 4 is a fragmentary view of the same.

Fig. 5 is a vertical section through the container.

Fig. 6 is an end view with the cover partly broken.

Fig. 7 is a partial section through the casing.

Fig. 8 shows the body member separately.

As shown in Figs. 1-8, the magazine comprises a body portion 2 having an end member 3 at one side, and an end member 4 at the other side. The body 2 is formed from a strip 5 of sheet metal having overlapping end portions 6 and 7, see Fig. 6. The end member 3 has a rim 8 that engages the outer portion of the body 2 at the edge 9, and this member or cover is removable for insertion of the film roll. The inner overlapping portion 7 is given an inward bend at 10, see Fig. 7, whereby the remaining end portion is offset from the overlapping portion 6 to form a passageway 11 between the lapping portions, that is open at both ends to permit the passage of the film. By this means an opening 12 is provided into the magazine that by reason of the cylindrical shape of the passage will prevent entrance of light rays, and it is not necessary to provide cloth or velvet as usual with film magazines to exclude the light. The inner free edge 13 may be bent back to prevent wear on the film.

The other end member 4 is provided with a rim 14, and this member is inserted in the body member, see Fig. 4, and permanently secured therein. The inner lapping portion 7 does not extend the full width of the body member, as shown in Fig. 8, but only to the end member 4. At one side of the slot or opening 12 the body end is secured to the end member 4 to retain it in position. But at the other end of this slot the edge is given a depression 15 to engage the inner wall 7, and form a support for the free edge of the slot to keep it open, for the free passage of the film.

Means are provided in the inside of the magazine for receiving a roll of film 16, that may be wound on a suitable spool 17, see Fig. 2. A sleeve 18 has its flanged end secured to the end wall 4, see Fig. 5, and a shaft 19 is mounted to rotate therein. An arm 20 on the shaft may engage a suitable actuating member to rotate the shaft. The inner end of the shaft 19 is shown as having a sleeve 20′ secured thereon. This latter sleeve may have a flat portion 21, to engage a similar bore in the spool 17 for the film roll, so that when the film roll is placed on this sleeve it will be held against turning on the sleeve and caused to rotate with the shaft.

In Fig. 1 a portion of a camera is shown and two magazines mounted therein, the film being withdrawn from one magazine as wound up in the other magazine after its exposure; it being understood that suitable advancing means for the film are provided in the camera. Means are shown for supporting these magazines on the camera wall, whereby they can be readily detached. Each magazine is shown as provided with two or more bayonet slots 23. The side wall 24 of the casing is provided with bent lugs 25, see Fig. 4, whose free end portions are adapted to engage in the bayonet slot, to hold the magazine in position as shown in Fig. 1.

It will be understood that the magazine as shown is very cheaply and easily formed from sheet metal, and that the cylindrical passage for the film is provided when the body and one end member are assembled. This passage will be light-tight and not require cloth or other means to exclude the light rays.

When the magazines are secured to the side wall 24 of the camera, and the two removable covers 3 are removed, as indicated in Fig. 1 by the broken portions, the passage 11 between the overlapping portions 6 and 7 will be exposed or open at this side of each magazine. This will permit the insertion and removal of an intermediate portion of the film, by a movement laterally to the film; and does not require the insertion of the end portion of the film, as necessary in the present arrangement where such passage is closed at both sides. The depression at 15 can be slightly raised; for this insertion of the film laterally.

What I claim is:—

1. A magazine for a comparatively large roll or narrow film requiring rapid passage of the film therefrom, comprising a casing having end members, and a cylindrical side member, the latter comprising a continuous strip of sheet metal bent to form an almost complete cylinder, one end of the strip being extended, and first bent abruptly inward and then again bent to extend adjacent the inner wall of the cylinder and a short distance therefrom to constitute an arcuate channel for the film passing in or out of the casing between said walls and between the bent portion and the adjacent end of the strip, the inner end of the strip being doubled back to conceal the raw edge and provide a rounded surface for the film, said inside extension of the strip being deflected at one side to engage the outer portion and support the inner wall, the other edge of the inner lapping portion being secured to the adjacent end member.

2. A magazine for a roll of film, comprising a casing having end members, and a cylindrical side member, formed of a continuous strip of sheet metal with the end portions lapping to produce a channel between the integral lapping portions that extends over a considerable portion of the periphery, with one end of the channel open to the interior of the casing and the other end of the channel being open on the exterior of the casing for passage of the film, one end member comprising a disk and a rim that is inserted in the casing with the rim projecting outwardly and secured therein, the lapping portion of the casing on the inside of the channel being of reduced width and located between the said latter end member and the other end member.

Signed at New York City, N. Y., on August 31, 1920.

REINHART W. PITTMAN.